United States Patent
Wang

(10) Patent No.: US 11,298,609 B2
(45) Date of Patent: Apr. 12, 2022

(54) VIRTUAL OBJECT MOVEMENT CONTROL METHOD AND APPARATUS, ELECTRONIC APPARATUS, AND STORAGE MEDIUM

(71) Applicant: Tencent Technology (Shenzhen) Company Limited, Shenzhen (CN)

(72) Inventor: Han Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/900,707

(22) Filed: Jun. 12, 2020

(65) Prior Publication Data

US 2020/0298104 A1 Sep. 24, 2020

Related U.S. Application Data

(63) Continuation of application No. PCT/CN2019/076508, filed on Feb. 28, 2019.

(30) Foreign Application Priority Data

Mar. 30, 2018 (CN) .......................... 201810276793.8

(51) Int. Cl.
*A63F 13/2145* (2014.01)
*A63F 13/533* (2014.01)
(Continued)

(52) U.S. Cl.
CPC ........ *A63F 13/2145* (2014.09); *A63F 13/533* (2014.09); *G06F 3/0486* (2013.01); *G06F 3/04883* (2013.01); *A63F 2300/1075* (2013.01)

(58) Field of Classification Search
CPC .. A63F 13/214; A63F 13/2145; A63F 13/533; A63F 2300/1075; A63F 13/422; G06F 3/04883
See application file for complete search history.

(56) References Cited

U.S. PATENT DOCUMENTS 4,353,552 A * 10/1982 Pepper, Jr. .............. A63F 13/06
463/37
7,309,287 B2 * 12/2007 Miyamoto .......... A63F 13/2145
463/37
(Continued)

FOREIGN PATENT DOCUMENTS

CN 106155553 A 11/2016
CN 107019909 A 8/2017
(Continued)

OTHER PUBLICATIONS

Tencent Technology, WO, PCT/CN2019/076508, Jun. 3, 2019, 5 pgs.

(Continued)

*Primary Examiner* — Chase E Leichliter
(74) *Attorney, Agent, or Firm* — Morgan, Lewis & Bockius LLP

(57) ABSTRACT

Embodiments of a method for controlling a virtual object movement performed by an electronic apparatus and a non-transitory computer readable storage medium provided in embodiments of the present disclosure. After detecting that a touch operation on a virtual joystick region meets a specific condition, a target function button is displayed; and in a case that a touch operation on the target function button is detected, the virtual object is controlled to move automatically. In this way, coherent operations are performed on the same region in the same operating manner, so that the virtual object is enabled to move automatically, thereby improving convenience and flexibility of user operations.

20 Claims, 11 Drawing Sheets

(51) Int. Cl.
*G06F 3/0486* (2013.01)
*G06F 3/04883* (2022.01)

(56) References Cited

U.S. PATENT DOCUMENTS

| | | | | |
|---|---|---|---|---|
| 7,374,490 | B2* | 5/2008 | Tahara | A63F 13/10 |
| | | | | 463/43 |
| 7,578,742 | B2* | 8/2009 | Miyamoto | A63F 13/02 |
| | | | | 463/37 |
| 7,942,743 | B2* | 5/2011 | Tahara | A63F 13/2145 |
| | | | | 463/36 |
| 8,187,095 | B2* | 5/2012 | Wong | A63F 13/06 |
| | | | | 463/36 |
| 8,382,591 | B2* | 2/2013 | Toy | A63F 13/355 |
| | | | | 463/37 |
| 9,174,131 | B2* | 11/2015 | Shirasaka | A63F 13/822 |
| 9,348,488 | B1 | 5/2016 | Renema, II | G06F 3/0482 |
| 9,772,743 | B1 | 9/2017 | Mueller | G06F 3/04886 |
| 10,078,410 | B1 | 9/2018 | Isaak | G06F 3/04815 |
| 10,603,589 | B2 | 3/2020 | Miyamoto | A63F 13/2145 |
| 10,821,355 | B2 | 11/2020 | Miao | A63F 13/2145 |
| 2004/0130525 | A1 | 7/2004 | Suchocki | A63F 13/533 |
| | | | | 345/156 |
| 2004/0263487 | A1* | 12/2004 | Mayoraz | G06F 3/04886 |
| | | | | 345/173 |
| 2005/0099400 | A1* | 5/2005 | Lee | G06F 3/04883 |
| | | | | 345/173 |
| 2005/0270309 | A1* | 12/2005 | Murata | A63F 13/525 |
| | | | | 345/632 |
| 2006/0026535 | A1* | 2/2006 | Hotelling | G06F 3/0488 |
| | | | | 715/863 |
| 2006/0111180 | A1* | 5/2006 | Cheng | A63F 13/06 |
| | | | | 463/36 |
| 2007/0200820 | A1* | 8/2007 | Svensson | G06F 3/0488 |
| | | | | 345/156 |
| 2010/0045623 | A1* | 2/2010 | Sakurai | A61B 5/7475 |
| | | | | 345/173 |
| 2010/0045667 | A1* | 2/2010 | Kornmann | G06F 3/017 |
| | | | | 345/419 |
| 2010/0156818 | A1* | 6/2010 | Burrough | G06F 3/041 |
| | | | | 345/173 |
| 2010/0162128 | A1* | 6/2010 | Richardson | H04M 1/0245 |
| | | | | 715/744 |
| 2010/0214234 | A1* | 8/2010 | Singhal | G06F 3/04883 |
| | | | | 345/173 |
| 2010/0238131 | A1* | 9/2010 | Aoyagi | G06F 3/04842 |
| | | | | 345/173 |
| 2010/0299622 | A1* | 11/2010 | Sako | G01T 1/161 |
| | | | | 715/764 |
| 2010/0321411 | A1* | 12/2010 | Paek | G06F 3/04883 |
| | | | | 345/684 |
| 2011/0032202 | A1* | 2/2011 | Aoyagi | G06F 3/0488 |
| | | | | 345/173 |
| 2011/0080351 | A1* | 4/2011 | Wikkerink | G06F 3/0488 |
| | | | | 345/173 |
| 2011/0172013 | A1* | 7/2011 | Shirasaka | A63F 13/92 |
| | | | | 463/37 |
| 2013/0217498 | A1* | 8/2013 | Wang | A63F 13/2145 |
| | | | | 463/37 |
| 2013/0311919 | A1* | 11/2013 | Faidy | G06F 3/0481 |
| | | | | 715/765 |
| 2014/0066195 | A1* | 3/2014 | Matsui | A63F 13/06 |
| | | | | 463/30 |
| 2015/0182856 | A1* | 7/2015 | Mays, III | A63F 13/26 |
| | | | | 463/31 |
| 2018/0028914 | A1* | 2/2018 | Yamaguchi | A63F 13/92 |
| 2018/0164801 | A1* | 6/2018 | Kim | H04M 1/72415 |
| 2019/0099665 | A1* | 4/2019 | Miao | A63F 13/837 |
| 2020/0298104 | A1* | 9/2020 | Wang | A63F 13/92 |

FOREIGN PATENT DOCUMENTS

| | | |
|---|---|---|
| CN | 107132988 A | 9/2017 |
| CN | 107273037 A | 10/2017 |
| CN | 107754309 A | 3/2018 |
| CN | 107803028 A | 3/2018 |
| CN | 108509139 A | 9/2018 |
| JP | 2011141632 A | 7/2011 |
| JP | 2014045965 A | 3/2014 |
| KR | 20110134810 A | 12/2011 |
| KR | 20150054285 A | 5/2015 |
| KR | 20170100612 A | 9/2017 |

OTHER PUBLICATIONS

Tencent Technology, IPRP, PCT/CN2019/076508, Oct. 6, 2020, 6 pgs.
Tencent Technology, ISR, PCT/CN2019/076508, Jun. 3, 2019, 2 pgs.

* cited by examiner (a)

(b)

VIRTUAL OBJECT MOVEMENT CONTROL METHOD AND APPARATUS, ELECTRONIC APPARATUS, AND STORAGE MEDIUM

CROSS-REFERENCE TO RELATED APPLICATIONS

This application is a continuation application of PCT Application No. PCT/CN2019/076508, entitled "VIRTUAL OBJECT MOVEMENT CONTROL METHOD AND DEVICE, ELECTRONIC DEVICE AND STORAGE MEDIUM" filed on Feb. 28, 2019, which claims priority to Chinese Patent Application No. 201810276793.8, entitled "VIRTUAL OBJECT MOVEMENT CONTROL METHOD AND APPARATUS, ELECTRONIC APPARATUS, AND STORAGE MEDIUM" filed with the Chinese National Intellectual Property Administration on Mar. 30, 2018, all of which are incorporated by reference in their entirety.

FIELD OF THE TECHNOLOGY

The present disclosure relates to the field of computer technologies, and in particular, to a virtual object movement control method and apparatus, an electronic apparatus, and a storage medium.

BACKGROUND OF THE DISCLOSURE

With the development of computer technologies and diversification of terminal functions, there are increasing types of games that can be played on a terminal. A shooting game such as a first-person shooting (FPS) game or a third-person shooting (TPS) game is a relatively popular game. In the shooting game, there is a new game type referred to as a battle arena game. In this new game type, there are many players in the same virtual scene in a single round of the game, and a player can control a virtual object to gradually eliminate opponents in attack manners such as shooting or boxing, to win the final victory.

Currently, the virtual scene of this type of game is relatively large. For the sake of a strategic shift, the player usually needs to control the virtual object to perform a long-distance movement, and in this way, the player needs to continuously perform the same touch operation for a long time, to control the virtual object to move.

SUMMARY

Embodiments of the present disclosure provide a virtual object movement control method and apparatus, an electronic apparatus, and a storage medium, and provide a method for controlling a virtual object to automatically move in a virtual scene, thereby improving convenience and flexibility of operations. The technical solutions are as follows:

According to an aspect, a method for controlling a virtual object movement performed by an electronic apparatus, the method:

displaying a virtual joystick region in a terminal screen of the electronic apparatus;

displaying a target function button in the terminal screen in a case that a touch operation on the virtual joystick region is detected, a displacement of the touch operation is greater than a displacement threshold, and duration of the touch operation is greater than a target time, the target function button being used for controlling a virtual object to automatically move according to a target speed; and controlling the virtual object to automatically move according to the target speed in a virtual scene in a case that a touch operation on the target function button is detected.

According to an aspect, an electronic apparatus is provided, including a processor and a memory configured to store a computer program, the processor being configured to execute the computer program stored in the memory, to implement the method operations according to the foregoing virtual object movement control method.

According to an aspect, a non-transitory computer-readable storage medium is provided, storing a computer program, the computer program, when being executed by a processor, implementing the method operations according to the foregoing virtual object movement control method.

In the embodiments of the present disclosure, in a case of detecting that a touch operation on a virtual joystick region meets a specific trigger condition, a target function button is displayed, and in a case that a touch operation on the target function button is detected, the virtual object may be controlled to move automatically. In this way, coherent operations may be performed on the same region in the same operating manner, to enable the virtual object to move automatically with no need for a user to switch operations between different buttons, thereby reducing complexity of user operations, and improving convenience and flexibility of the user operations.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from the accompanying drawings without creative efforts.

DESCRIPTION OF EMBODIMENTS

Figure 1:
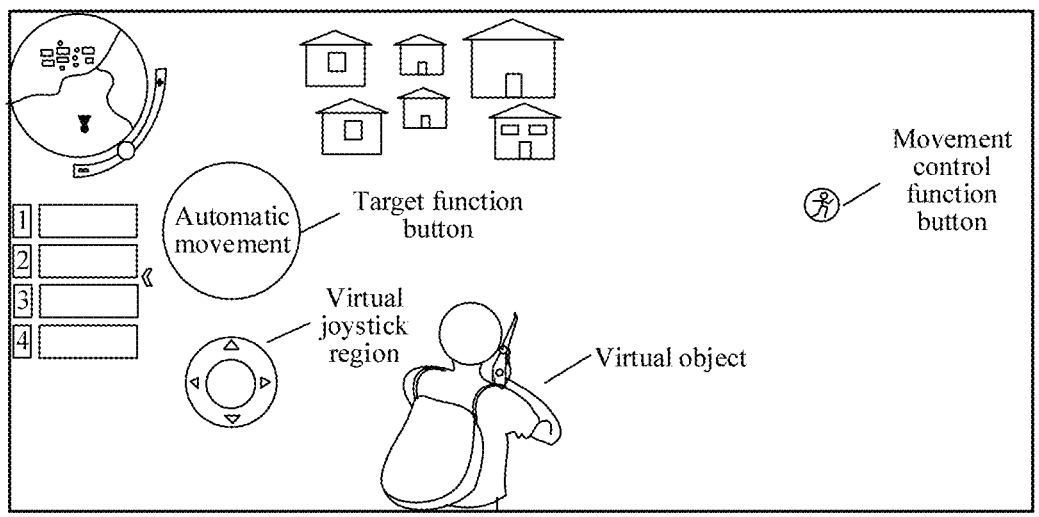
FIG. 1 is a schematic diagram of a terminal interface according to an embodiment of the present disclosure.

To make the objectives, technical solutions, and advantages of the present disclosure clearer, the following further describes implementations of the present disclosure in detail with reference to the accompanying drawings.

Embodiments of the present disclosure mainly relate to a video game scene or a simulation training scene. Using the video game scene as an example, a user may perform an operation on a terminal in advance. After the terminal detects the operation of the user, a game configuration file of a video game may be downloaded, and the game configuration file may include an application program, interface display data, virtual scene data, or the like of the video game, so that the user may invoke the game configuration file while logging in to the video game on the terminal, to render and display an interface of the video game. The user may perform a touch operation on the terminal. After the terminal detects the touch operation, the terminal may obtain game data corresponding to the touch operation, and render and display the game data, where the game data may include virtual scene data, behavior data of virtual objects in the virtual scene, and the like.

The virtual scene involved in the embodiments of the present disclosure may be used for simulating a three-dimensional virtual space, or may be used for simulating a two-dimensional virtual space, and the three-dimensional virtual space or the two-dimensional virtual space may be an open space. The virtual scene may be used for simulating a real environment in reality. For example, the virtual scene may include the sky, the land, and the ocean, and the land may include environment elements such as a desert and cities. The user may control a virtual object to move in the virtual scene, the virtual object may be a virtual image used for representing the user in the virtual scene, and the virtual image may be in any form, such as a person or an animal. This is not limited in the embodiments of the present disclosure. The virtual scene may include a plurality of virtual objects, and each virtual object has a shape and a volume in the virtual scene, and occupies some space in the virtual scene.

Using a shooting game as an example, the user may control the virtual object to freely fall, glide, or open a parachute to fall in the sky of the virtual scene, or run, jump, crawl, or stoop to move forward on the land, or may control the virtual object to swim, float, or dive in the ocean. Certainly, the user may alternatively control the virtual object to take a vehicle to move in the virtual scene. The foregoing scenes are merely used as an example for description, and this is not specifically limited in the embodiments of the present disclosure. The user may alternatively control the virtual object to fight against another virtual object by using a weapon, and the weapon may be a cold weapon, or may be a hot weapon. This is not specifically limited in the embodiments of the present disclosure.

When the user intends to control the virtual object to move, the user may perform a touch operation on a virtual joystick region on a terminal screen, and the touch operation of the user on the virtual joystick region may be a slide operation, or may be a tap operation. This is not limited in the embodiments of the present disclosure. A shape of the virtual joystick region may be a circle, or may be a square. The virtual joystick region may be located at a left side of the terminal screen, or may be located at a right side of the terminal screen, and the shape and a specific location of the virtual joystick region are not specifically limited in the embodiments of the present disclosure.

Specifically, the terminal may obtain, according to a location of an end point of the touch operation of the user relative to the virtual joystick region, a direction and a speed at which the user intends to control the virtual object to move, and a displacement may be a distance between the location of the end point of the touch operation and a central point of the virtual joystick region. The central point may be located in a center of the virtual joystick region, or may be located in another location. This is not specifically limited in the embodiments of the present disclosure. In a possible implementation, the terminal may obtain, according to the displacement of the touch operation, a moving speed of a controlled virtual object corresponding to the touch operation. Specifically, the moving speed of the virtual object may be in direct proportion to the displacement. That is, the greater the displacement is, the greater the moving speed of the virtual object is; and the less the displacement is, the less the moving speed of the virtual object is.

In a video game scene, for ease of user operations, the terminal interface may be further provided with a target function button, and the target function button is used for controlling the virtual object to automatically move according to a target speed. The automatic movement refers to continuous movement in a case that no operation is detected on the virtual joystick region. That is, the terminal may autonomously control the virtual object to move continuously with no need for the user to perform a touch operation. Specifically, a default displayed state of the target function button may be a hidden state. That is, in a normal state, the target function button is not displayed on the terminal interface, and the user needs to perform a touch operation to trigger the terminal to display the target function button. A display location of the target function button may be around the virtual joystick region, the user may perform a corresponding touch operation on the virtual joystick region, and the terminal may display the target function button when the touch operation is detected.

In a possible implementation, because dominant hands of different users may be different, to improve the flexibility of operations and practicability of the function of controlling the virtual object to automatically move according to a target speed, a movement control function button may be further provided on another side of the terminal screen, the movement control function button and the target function button have the same function and are respectively displayed in different regions of the screen. In a possible implementation, the movement control function button and the target function button may be respectively displayed on two sides of the screen. In this way, the user may freely choose to use a left hand to perform a touch operation on the left function button, or use a right hand to perform a touch operation on the right function button, so that the user may freely select the left hand or the right hand to trigger the same function, and therefore the operation is flexible and convenient. Certainly, the movement control function button and the target function button may alternatively be located on one side of the screen, and the locations of the two buttons may both be set or adjusted by a related technician according to a design requirement, and certainly, the locations may alternatively be set or adjusted by the user according to a using habit of the user. This is not limited in the embodiments of the present disclosure.

FIG. 1 is a schematic diagram of a terminal interface according to an embodiment of the present disclosure. As shown in FIG. 1, using an example in which the virtual joystick region is circular, the virtual joystick region is located at a left side of the terminal interface, and a touch operation of the user on the virtual joystick region is a slide operation, there may be four directional arrow icons in the virtual joystick region, the four directional arrow icons are respectively upper, lower, left, and right respectively used for representing forward, backward, leftward, and rightward. The four directional arrow icons are merely used for making pointing directions of the virtual joystick region more intuitive, to provide guidance about how the user determines a direction corresponding to a user operation. Certainly, the four directional arrow icons may alternatively not be displayed in the virtual joystick region, and the user may be gradually familiar with the touch operation on the virtual joystick region according to an actual operation situation. Because the upper of the virtual joystick region indicates forward, and the automatic movement of the virtual object controlled by the user is generally moving forward, the terminal may dispose the target function button on the upper of the virtual joystick region. In a possible implementation, the target function button may be a graph, or may include text information, and this is not specifically limited in the embodiments of the present disclosure. The terminal may further provide a movement control function button on the right side of the terminal interface, so that the user may use the right hand to perform a touch operation on the movement control function button, and the foregoing function of controlling the virtual object to automatically move according to a target speed may alternatively be implemented.

Figure 2:
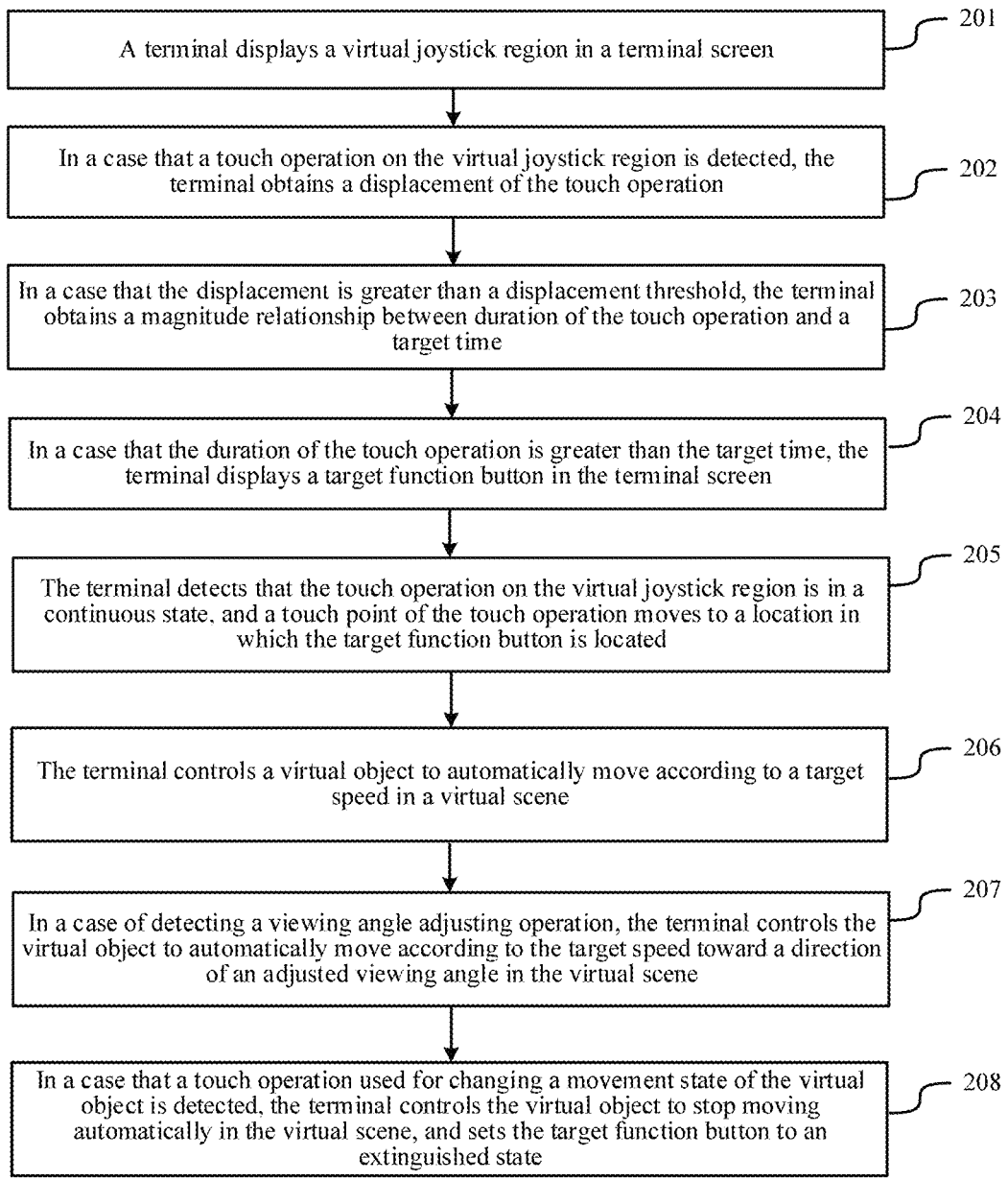
FIG. 2 is a flowchart of a virtual object movement control method according to an embodiment of the present disclosure.

FIG. 2 is a flowchart of a virtual object movement control method according to an embodiment of the present disclosure. The virtual object movement control method may be applied to an electronic apparatus, and description is made below by using an example in which the electronic apparatus is provided as a terminal. Referring to FIG. 2, the virtual object movement control method includes the following steps:

Step 201. A terminal displays a virtual joystick region in a terminal screen.

The terminal may render and display a virtual scene, and display a virtual joystick region in a terminal screen, so that the terminal may control a virtual object in the virtual scene to move in a case that a touch operation of a user on the virtual joystick region is detected. For example, in a video game scene, when a single round of a game starts, the terminal may render and display a virtual scene from a current viewing angle of the terminal, and display a virtual joystick region in the terminal screen. In a case that the terminal detects a viewing angle adjusting operation, the terminal may render and display the virtual scene according to an adjusted viewing angle. In a case that the terminal detects a touch operation on the virtual joystick region, the terminal may control the virtual object to move in the virtual scene.

In a possible implementation, to prevent the virtual scene from being blocked, step 201 may be further: a terminal displays a virtual joystick region according to a target transparency in a terminal screen. The target transparency may be preset by a related technician, or may be adjusted by a user of the terminal according to a using habit of the user. This is not specifically limited in the embodiments of the present disclosure.

Step 202: In a case that a touch operation on the virtual joystick region is detected, the terminal obtains a displacement of the touch operation.

The touch operation may be a slide operation, or may be a drag and drop operation. The drag and drop operation refers to an operation of pressing an icon on the screen, and relatively slowly moving the icon to another location. In an embodiment of the present disclosure, in a case that the touch operation is a slide operation, the touch operation may start from the virtual joystick region, and slide in a direction away from the virtual joystick region; and in a case that the touch operation is a drag and drop operation, the touch operation may start from the virtual joystick region, and drag a virtual joystick out of the virtual joystick region. Certainly, the touch operation may be further another operation, such as a tap operation or a press operation. Description is made herein merely by using an example in which the touch operation is a slide operation or a drag and drop operation, and a specific operation mode of the touch operation is not limited in the embodiments of the present disclosure.

In a case that the terminal detects a touch operation on the virtual joystick region, a displacement of the touch operation may be first obtained, so that whether a moving speed at which a current touch operation controls the virtual object to move reaches a speed threshold may be determined subsequently based on the displacement. The speed threshold may be equal to the target speed of the automatic movement, or be less than the target speed and a difference between the target speed and the speed threshold is less than a target speed difference. The displacement may refer to a distance between a location of an end point of the touch operation and a central point of the virtual joystick region.

In a possible implementation, to more intuitively and vividly represent a direction of a touch operation currently performed by the user relative to the virtual joystick region, in a case that the terminal detects a touch operation of the user on the virtual joystick region, the terminal may further display a virtual joystick in the screen to move along with a touch point of the touch operation of the user. Specifically, the virtual joystick may be displayed as a circular region. Further, the terminal may further display a circular region for following a touch point of the touch operation of the user, and display a drag and drop effect between the circular region and the virtual joystick region. For example, the drag and drop effect may be a fan-shaped region formed by the circular region and the central point of the virtual joystick region. In a case that the terminal detects that the touch operation is ended, the terminal may further display that the virtual joystick returns to the center of the virtual joystick region. For example, the terminal displays that the virtual joystick rebounds to the center of the virtual joystick region, or the terminal directly sets a displayed state of the virtual joystick to a hidden state. Certainly, the terminal may alternatively not display the foregoing virtual joystick, and this is not specifically limited in the embodiments of the present disclosure.

Step 203: In a case that the displacement is greater than a displacement threshold, the terminal obtains a magnitude relationship between duration of the touch operation and a target time.

In a possible implementation, in a case that the terminal detects a touch operation on the virtual joystick region, the terminal may alternatively control the virtual object to move according to a moving speed corresponding to the touch operation.

The terminal may obtain, based on a displacement of a current touch operation, a moving speed of the virtual object corresponding to the touch operation. Specifically, the moving speed of the virtual object and the displacement of the touch operation are in a positive correlation. The greater the displacement of the touch operation is, the greater the moving speed of the virtual object is. The terminal may determine, according to whether the displacement is greater than a displacement threshold, whether the moving speed of the virtual object reaches a speed threshold, where the displacement threshold may be the quantity of preset pixels, a distance defined in a coordinate system of the terminal screen, or another value used for measuring a displacement of a touch operation, and this is not specifically limited in the embodiments of the present disclosure. Certainly, the terminal may alternatively re-determine, after obtaining the moving speed of the virtual object based on the displacement, whether the moving speed reaches the speed threshold. The terminal may determine whether duration of the touch operation reaches a target time in a case that the moving speed reaches the speed threshold.

The displacement threshold may be preset by a related technician, or may be adjusted by the user according to a using habit of the user. In a possible implementation, the displacement threshold may be further adjusted according to a size of the terminal screen, and a specific value of the displacement threshold is not limited in the embodiments of the present disclosure.

For example, description is made by using an example in which the virtual object stands on the land of the virtual scene and the displacement threshold is 20 distance units, where the distance unit may be one pixel or a preset quantity of pixels, or a distance value defined in the coordinate system of the terminal screen, or may be a distance unit in another measurement manner. In a case that the displacement is less than or equal to the displacement threshold, the terminal may control the virtual object to walk in the virtual scene, and the greater the displacement is, the greater the walking speed of the virtual object is. For example, the displacement is 5 distance units, and the terminal may control the virtual object to walk in the virtual scene. In a case that the displacement is greater than the displacement threshold, the terminal may control the virtual object to run in the virtual scene. For example, in a case that the displacement is greater than 21 distance units, the terminal may control the virtual object to run in the virtual scene.

In a case that environments in which the virtual object is located are different, motion states of the virtual object are also different, and target speeds of the virtual object during automatic movement may also be different. For example, the moving speed of the virtual object during swimming and the moving speed of the virtual object during running, flying, or crawling may be different, and target speeds of the virtual object in different motion states may also be different. The target speeds may be preset by a technician according to different virtual scenes, and values of the target speeds are not specifically limited in the embodiments of the present disclosure.

In a case that the displacement is greater than the displacement threshold, it indicates that the moving speed of the virtual object has reached the speed threshold, and preliminarily satisfies a condition of switching to automatic movement, and therefore the terminal may further obtain a time for which the user currently manually controls the virtual object to move. In a case that the time is relatively short, the user may implement the movement in a quite short time and the terminal does not need to provide a function of controlling the virtual object to automatically move for the user; and in a case that the time is relatively long, the terminal may provide this function for the user, thereby improving convenience of operations. Specifically, the terminal may determine, by determining whether the duration of the touch operation reaches the target time, whether the function of controlling the virtual object to automatically move needs to be provided. The target time may be preset by a technician, and the target time may be set based on the foregoing target speed, the size of the virtual scene, and the like. For example, the target time may be 2 seconds (s), and this is not specifically limited in the embodiments of the present disclosure.

Step 204: The terminal displays a target function button in the terminal screen in a case that the duration of the touch operation is greater than the target time.

In a case that the duration of the touch operation is greater than the target time, the touch operation satisfies a specific trigger condition, and the foregoing function of controlling the virtual object to automatically move may be further provided. In a case that the duration is less than or equal to the target time, the terminal does not need to provide the function, and directly controls the virtual object to move according to the touch operation of the user. The process is essentially a process in which in a case that the terminal detects the touch operation of the user, the terminal determines whether the touch operation satisfies a condition for providing the function of controlling the virtual object to automatically move. In a case that the touch operation satisfies the condition, the terminal may perform the process of displaying the target function button.

The default displayed state of the target function button is a hidden state, and in a case that the terminal detects, through step 202 to step 204, that a touch operation on the virtual joystick region satisfies the foregoing condition, the terminal may display the target function button. In a case that the terminal displays the target function button, the user may perform a touch operation on a location in which the target function button is located, to trigger to control the virtual object to automatically move.

In a possible implementation, based on that the display location of the target function button may be obtained in different manners, step 204 may further include the following three situations:

First situation: the display location of the target function button is fixed.

In the first situation, the terminal may obtain a first display location directly above the virtual joystick region in the terminal screen, and display the target function button on the first display location. The first display location of the target function button may be preset in the terminal. In a case that the terminal performs step 204, the first display location located directly above the virtual joystick region may be obtained, and the target function button is displayed on the first display location. For example, as shown in FIG. 1, the first display location may be a fixed location directly above the virtual joystick region, and is spaced apart from the virtual joystick region by a target distance.

Second situation: the display location of the target function button may be obtained according to a touch point location of the touch operation.

Figure 3:
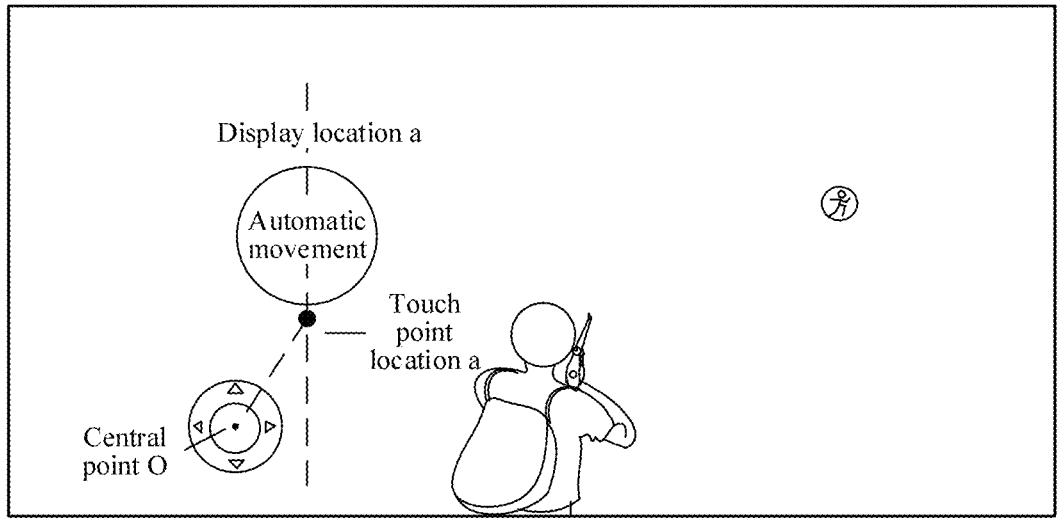
FIG. 3 is a schematic diagram of a terminal interface according to an embodiment of the present disclosure.

In the second situation, a second display location is obtained directly above the touch point location of the touch operation on the virtual joystick region, and the target function button is displayed on the second display location. The location in which the target function button is currently displayed is obtained in real time based on the touch point location. In this way, a distance by which the user needs to move to perform an operation may be reduced, and the convenience of operations is greatly increased, so that the target function button can differ as the operating location differs, to flexibly adapt to the using habit of the user. For example, as shown in FIG. 3, the display location a may be located directly above the touch point location a. That is, the display location a is obtained according to the touch point location a of the user.

Third situation: the display location of the target function button may be obtained according to a direction of a connecting line between the touch point location of the touch operation and the virtual joystick region.

In the third situation, step 204 may be implemented by the following steps (1) and (2).

(1) The terminal obtains, according to a direction of a connecting line between the touch point location of the touch operation of the virtual joystick region and the virtual joystick region, a third display location of the target function button in the direction of the connecting line.

(2) The terminal displays the target function button on the third display location.

The touch point location of the touch operation may be a location of a touch point between the terminal screen and a finger of the user or another object used for performing the touch operation. In the embodiments of the present disclosure, description is merely made by using an example in which the user uses a finger to perform a touch operation on the terminal screen.

In a possible implementation, step (1) may include at least the following two implementations.

First implementation: the terminal obtains, according to a direction of a connecting line between the touch point location of the touch operation on the virtual joystick region and the virtual joystick region, a location of which a distance to the virtual joystick region is a first target distance in the direction of the connecting line.

Figure 4:
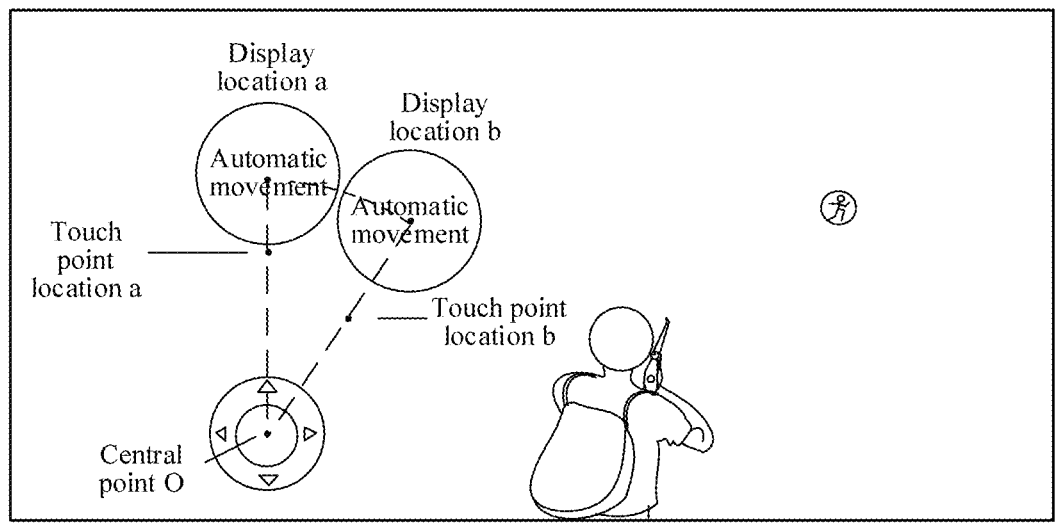
FIG. 4 is a schematic diagram of a terminal interface according to an embodiment of the present disclosure.

In the first implementation, the distance between the third display location of the target function button and the virtual joystick region is fixed, and the third display location of the target function button may be an arc that uses the central point of the virtual joystick region as a center and of which a radius is the first target distance. For example, as shown in FIG. 4, in a case that the touch point location of the touch operation is a touch point location a, the terminal may obtain a display location a; and in a case that the touch point location of the touch operation is a touch point location b, the terminal may obtain a display location b. A distance between the display location a and the central point O and a distance between the display location b and the central point O are the same, and the two distances are both the first target distance.

Figure 5:
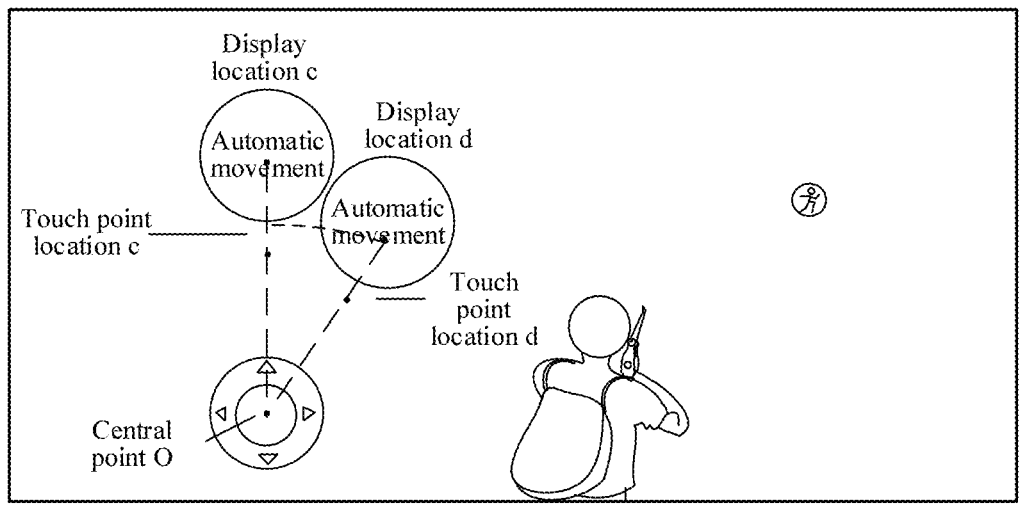
FIG. 5 is a schematic diagram of a terminal interface according to an embodiment of the present disclosure.

Second implementation: the terminal obtains, according to a direction of a connecting line between the touch point location of the touch operation on the virtual joystick region and the virtual joystick region and the touch point location, a location of which a distance to the touch point location is a second target distance in the direction of the connecting line. For example, as shown in FIG. 5, in a case that the touch point location of the touch operation is a touch point location c, the terminal may obtain a display location c; and in a case that the touch point location of the touch operation is a touch point location d, the terminal may obtain a display location d. A distance between the display location c and the touch point location c is the same as a distance between the display location d and the touch point location d, and the two distances are both the second target distance.

The first target distance and the second target distance may be both preset by a related technician, or may be adjusted by the user of the terminal according to a using habit of the user. Certainly, the two distances may alternatively be adjusted according to a size of the terminal screen, and specific values of the first target distance and the second target distance are not limited in the embodiments of the present disclosure. A process in which the terminal obtains the display location of the target function button is described above by merely using two implementations as an example. Step (1) may further include another implementation, and this is not specifically limited in the embodiments of the present disclosure.

The two situations that step 204 may include are described above in detail. In a possible implementation, the process of obtaining the display location of the target function button may be further implemented in manners such as fixing a distance between the display location and the virtual object, and this is not limited in the embodiments of the present disclosure.

In a possible implementation, the terminal detects a touch operation on the virtual joystick region in step 204, and in a case that a displacement of the touch operation is greater than a displacement threshold, and duration of the touch operation is greater than a target time, the terminal may further display prompt information, the prompt information being used for prompting to continuously perform the touch operation, and move the touch point of the touch operation to the location in which the target function button is located, to perform a touch operation on the target function button. In a possible implementation, the prompt information may be text information, or may be image information, and a specific form of the prompt information is not limited in the embodiments of the present disclosure.

Figure 6:
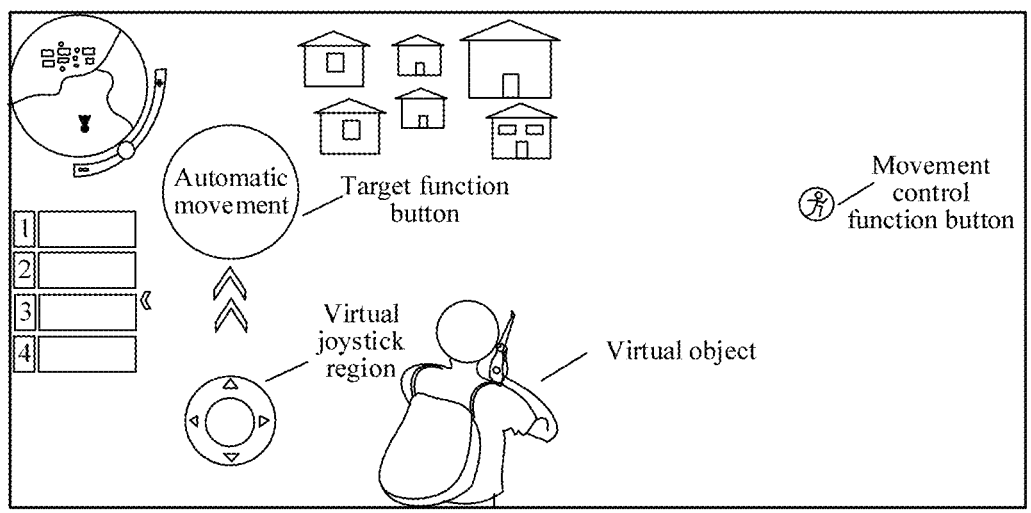
FIG. 6 is a schematic diagram of a terminal interface according to an embodiment of the present disclosure.
Figure 7:
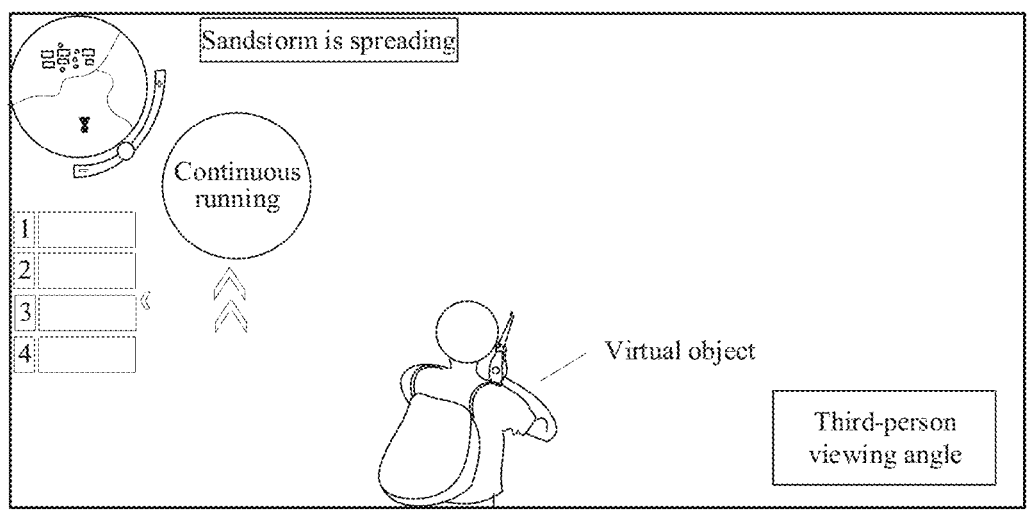
FIG. 7 is a diagram of an actual interface of a terminal according to an embodiment of the present disclosure.

In a possible implementation, the prompt information may be an arrow. The terminal may display a target arrow between the virtual joystick region and the target function button, a direction of the target arrow being pointing to the target function button from the virtual joystick region. Certainly, the target arrow may be a static effect, or may be a dynamic effect so as to dynamically represent a movement track of the touch operation of the user, so that the user may correctly perform a touch operation on the target function button, to achieve an objective of intending to switch a movement state of the virtual object to an automatic movement state. For example, a specific display effect of the target arrow may be shown in FIG. 6. In a case that the target function button is located above the virtual joystick region, the target arrow is located between the target function button and the virtual joystick region, and the target arrow points to the target function button from the virtual joystick region. FIG. 7 shows a diagram of an actual interface.

The foregoing step 202 to step 204 are a process of displaying the target function button in the terminal screen in a case that a touch operation on the virtual joystick region is detected, the displacement of the touch operation is greater than the displacement threshold, and the duration of the touch operation is greater than the target time. The terminal needs to detect that the touch operation simultaneously satisfies the foregoing two conditions that the displacement is greater than the displacement threshold, and the duration is greater than the target time. In this case, the user may be controlling the virtual object to move quickly, so that the target function button may be displayed while controlling the virtual object to move quickly, to prompt the user that a current quick movement state of the virtual object may be set to an automatic movement state. In a case that the displacement of the touch operation is less than or equal to the displacement threshold after step 202, it may be considered that the user is controlling the virtual object to move slowly, and the user may not need to control the virtual object to automatically move. Therefore, the terminal may skip step 203 and step 204, but directly controls, based on a correspondence between the displacement and a moving speed, the virtual object to move according to the moving speed corresponding to the touch operation, and does not display the target function button.

Step 205: In a case of detecting that the touch operation on the virtual joystick region is in a continuous state, and a touch point of the touch operation moves to a location in which the target function button is located, the terminal performs step 206.

The terminal displays the target function button in the screen, and the user may continuously perform the currently performed touch operation based on the foregoing prompt information, and move the touch point of the touch operation to the location in which the target function button is located. In this way, after the terminal detects that a first touch operation is in a continuous state and the touch point of the first touch operation moves the location in which the target function button is located, that is, the terminal detects that the user performs a touch operation on the target function button, where the touch operation means that the function of controlling the virtual object to automatically move is initiated or activated, the terminal may perform step 206, to provide a service of controlling the virtual object to automatically move.

For example, using an example in which the touch operation of the user on the virtual joystick region may be displayed in the screen in a form of dragging and dropping the virtual joystick, in a case that the terminal detects the drag and drop operation of the user, a distance between a location on which the drag and drop operation drags the virtual joystick to stop and the virtual joystick region reaches the displacement threshold, and the drag and drop operation lasts for the target time, the terminal may display the target function button in the screen, and the user continues to perform the drag and drop operation to move the virtual joystick to the location in which the target function button is located, to trigger the target function button. In this case, the terminal detects the touch operation on the target function button, and the current touch operation may trigger the function of controlling the virtual object to automatically move, thereby performing step 206.

Certainly, in a possible implementation, there is further a possible scene in which the terminal detects that the touch operation on the virtual joystick region is in a continuous state, but the touch point of the touch operation has not moved to the location in which the target function button is located. In this scene, the terminal may display the target function button in the terminal screen, and step 205 may be performed in a case that the situation in step 205 is detected subsequently. Certainly, there is further another possible scene in which the terminal detects that the touch operation on the virtual joystick region is ended. In this scene, the terminal may set the displayed state of the target function button to a hidden state. In this scene, in a case that the terminal detects that the touch operation on the virtual joystick region is ended, the terminal may further control the virtual object to stop moving in the virtual scene.

Step 206: The terminal controls a virtual object to automatically move according to a target speed in a virtual scene.

In a case that the terminal detects a touch operation on the target function button, the terminal may control the virtual object to move according to the target speed, and the movement state of the virtual object is changed to the automatic movement state. That is, without any operation of the user, the terminal still controls the virtual object to move according to a current moving direction and a current moving speed.

In a possible implementation, in a case that a touch operation on the target function button is detected, the terminal may further set the target function button to be highlighted, such as lighted, to control the displayed state of the target function button to change, so as to prompt the user that the function of controlling the virtual object to automatically move has been currently activated, and touch operations on the virtual joystick region are no longer required, thereby reducing incorrect operations of the user and improving convenience of operations.

In a possible implementation, after the terminal sets the target function button to be highlighted, the terminal may further control the target function button to be displayed in the center of the virtual joystick region. Specifically, the terminal may dynamically move the display location of the target function button from a specified location to the center of the virtual joystick region. Further, a moving process of the display location of the target function button may be presented as a rebounding effect. After the terminal sets the target function button to be highlighted, in a case that the touch operation on the target function button is detected again, the terminal may control the virtual object to stop moving automatically. Certainly, in a case that the terminal detects a touch operation on the virtual joystick region, the terminal may also control the virtual object to stop moving automatically.

Generally, the user may be accustomed to controlling the virtual object to perform a next movement after stopping the automatic movement state of the virtual object. In this way, the user may first perform a touch operation on the target function button, and then perform a touch operation on the virtual joystick region, and in this case, the user needs to perform two operations. In a case that the terminal controls the target function button to be displayed in the center of the virtual joystick region, the user may directly start from the virtual joystick region to perform a drag and drop operation. In this way, in a case that the terminal detects that the user performs a touch operation on the target function button displayed in the center of the virtual joystick region, the terminal may control the virtual object to stop moving automatically, and control, based on the drag and drop operation of the user, the virtual object to move according to a speed corresponding to the drag and drop operation, thereby improving the coherence and convenience of the user operations.

Figure 8:
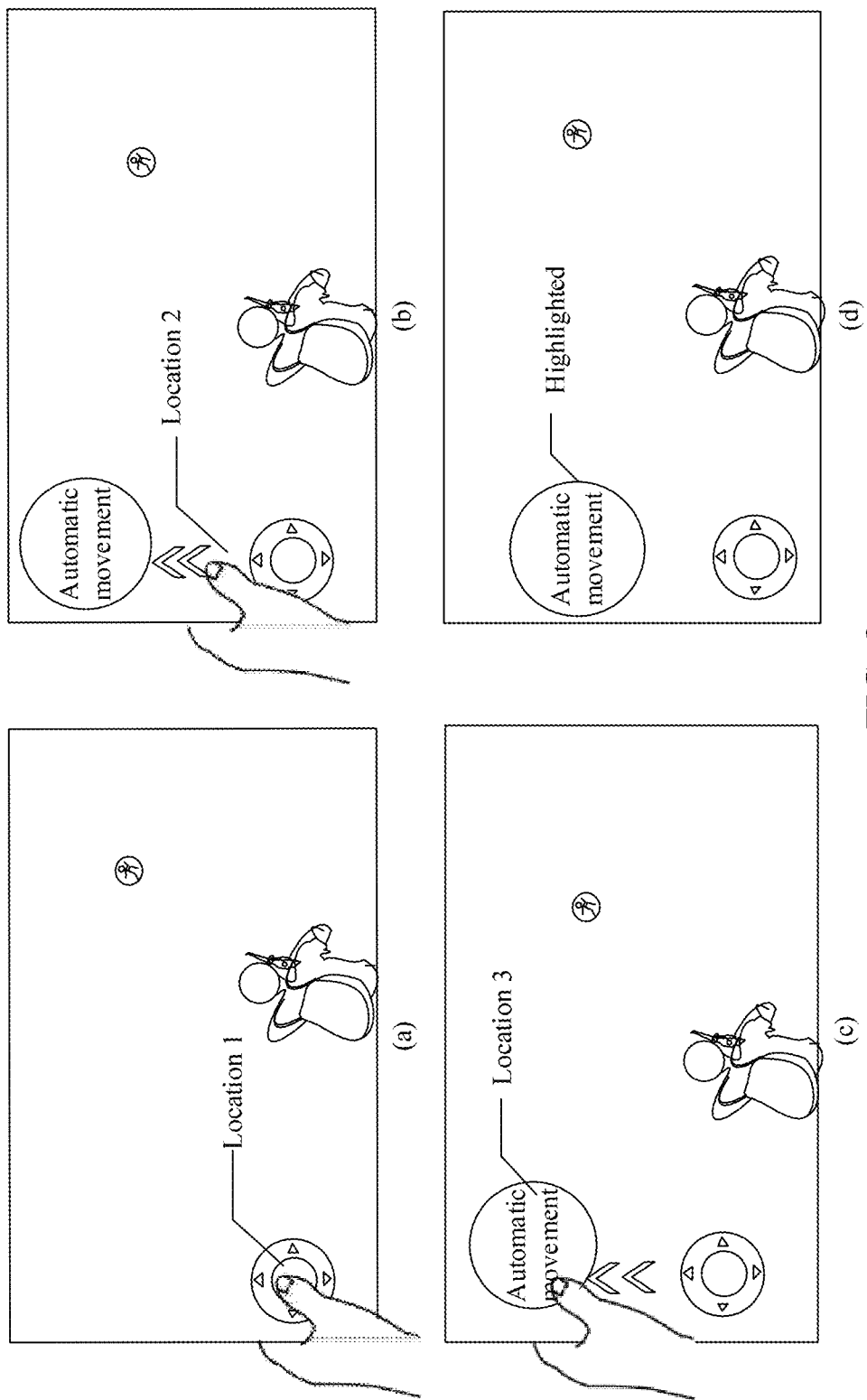
FIG. 8 is a schematic diagram of a virtual object movement control method according to an embodiment of the present disclosure.
Figure 9:
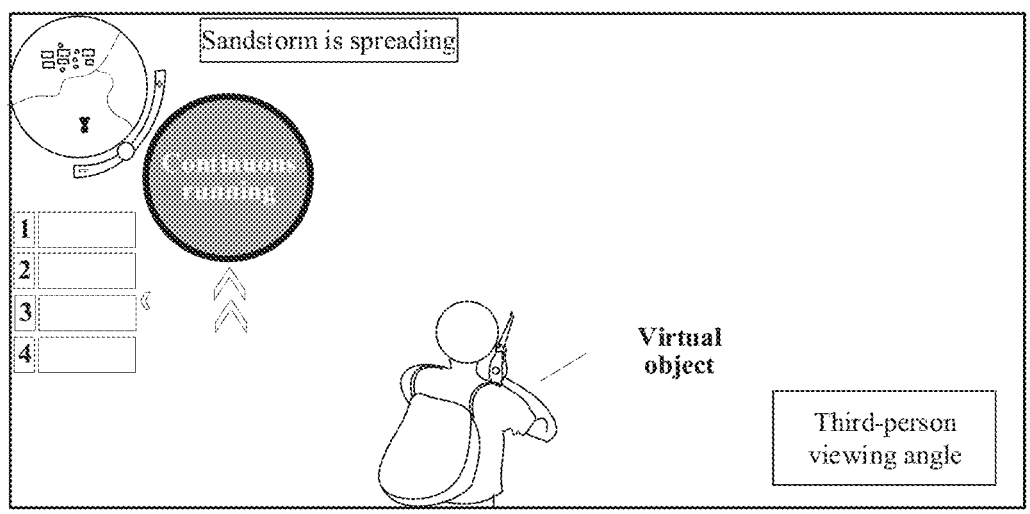
FIG. 9 is a diagram of an actual interface of a terminal according to an embodiment of the present disclosure.

The foregoing step 202 to step 206 are a process of updating a movement state of the virtual object in the terminal interface in a case that the terminal detects that the touch operation of the user on the virtual joystick region satisfies a specific trigger condition and further detects the touch operation on the target function button. An exemplary description is provided below for the display situation of the terminal interface in the foregoing step with reference to FIG. 8. FIG. 8 is a schematic diagram of a virtual object movement control method according to an embodiment of the present disclosure. As shown in FIG. 8, in a case that the terminal has not detected that the user performs a touch operation on the virtual joystick region, as shown in figure (a) and figure (b) in FIG. 8, and in a case that a finger of the user moves from a location 1 to a location 2, and the terminal detects that a touch point of the touch operation of the user moves from the location 1 to the location 2, the target function button and the prompt information may be displayed on the terminal interface in a case that a displacement between the location 1 and the location 2 is greater than a displacement threshold and it is detected that the hand of the user continuously presses on the location 2 for a target time. As shown in figure (b) and figure (c), the user may continuously perform a touch operation, and move to the target function button along a direction of an arrow, to move from the location 2 to a location 3, and after the terminal detects the movement operation of the user, the terminal may control the virtual object to automatically move according to a target speed in the virtual scene, and set the target function button to be highlighted, where a terminal interface during highlighting is shown in figure (d), and a diagram of an actual interface is shown in FIG. 9.

Step 207: In a case of detecting a viewing angle adjusting operation, the terminal controls the virtual object to automatically move according to the target speed toward a direction of an adjusted viewing angle in the virtual scene.

To enable the user to control, through simple operations, the virtual object to move, and to freely control the virtual object to accelerate, decelerate, or change a moving direction, the terminal may provide the foregoing virtual joystick region and provide an operating manner of adjusting a viewing angle of the terminal to adjust a moving direction of the virtual object.

In a case that the terminal detects the viewing angle adjusting operation, the terminal may adjust the viewing angle according to the viewing angle adjusting operation. The viewing angle adjusting operation may be a slide operation or a tap operation. Description is made by using an example in which the viewing angle adjusting operation is a slide operation, the terminal may perform a slide operation on a screen of the terminal, and in a case that the terminal detects the slide operation, the viewing angle may be adjusted according to a slide direction of the slide operation, to make the moving direction of the viewing angle to be same as the slide direction. Optionally, an angle by which the viewing angle moves and a sliding distance of the slide operation may be positively correlated. A larger sliding distance indicates a larger angle by which the viewing angle moves.

In a possible implementation, the user may alternatively set another virtual joystick region, and the another virtual joystick region is used for implementing the step in which the terminal detects the touch operation of the user to adjust the viewing angle. In a case that the terminal detects a touch operation in the virtual joystick region, a viewing angle adjustment direction and a viewing angle adjustment angle corresponding to the touch operation are obtained according to relative locations between an end point of the touch operation in the virtual joystick region and an origin of the virtual joystick region. Optionally, a direction of the end point of the touch operation relative to the origin of the virtual joystick region is the same as the viewing angle adjustment direction, and a distance between the end point of the touch operation and the origin of the virtual joystick region is positively correlated to the viewing angle adjustment angle. Several examples of operating manners of the viewing angle adjusting operation are described above, and a specific operating manner of the viewing angle adjusting operation is not limited in the embodiments of the present disclosure.

In a case that the terminal detects the viewing angle adjusting operation, the terminal may adjust the viewing angle, and control the virtual object to move toward an adjusted viewing angle without changing the automatic movement state of the virtual object. That is, the viewing angle adjusting operation of the user may change the moving direction of the virtual object, but does not interrupt the automatic movement state of the virtual object. In this way, the user may change the moving direction of the virtual object without repeatedly performing the foregoing operation of triggering the function of controlling the virtual object to automatically move, thereby effectively improving the convenience of operations.

In a possible implementation, to enable the user to observe a surrounding environment better in the falling process, to further select a landing point based on the surrounding environment or observe whether there is another virtual object in the surrounding environment, the terminal may further provide an observation viewing angle function button. In a case that the terminal detects a touch operation on the observation viewing angle function button, the terminal may adjust the viewing angle according to an operation direction of the touch operation on the observation viewing angle function button, and the terminal may not adjust the moving direction of the virtual object according to the touch operation on the observation viewing angle function button, and may not change the automatic movement state of the virtual object either. The touch operation may be performed on a target region centered on the observation viewing angle function button, a shape of the target region may be a circle, or may be another shape, and the shape and a size of the target region are not specifically limited in the embodiments of the present disclosure. In a case that the terminal detects that the touch operation on the observation viewing angle function button disappears, the viewing angle may be adjusted back to the viewing angle before a touch operation is performed on the observation viewing angle function button.

The foregoing step 202 to step 206 are a situation in which the user performs a touch operation on the target function button and may control the virtual object to automatically move. In a possible implementation, the user may alternatively perform a touch operation on a movement control function button in the terminal interface, to control the virtual object to automatically move, and for specific steps, reference may be made to an embodiment shown in FIG. 11.

Step 208: In a case that a touch operation used for changing a movement state of the virtual object is detected, the terminal controls the virtual object to stop moving automatically in the virtual scene, and sets the target function button to an extinguished state.

The touch operation used for changing a movement state of the virtual object may be a touch operation on the target function button, or may be a touch operation on a button for controlling the virtual object to squat or go prone, or may be a touch operation on the virtual joystick region. The user changes the movement state of the virtual object through a touch operation, and it may be considered that the user intends to cancel the automatic movement of the virtual object and manually control the virtual object, and the terminal may control the virtual object to stop moving automatically in the virtual scene in a case that the foregoing touch operation is detected.

Specifically, in a case that the touch operation is a touch operation on the target function button, the terminal may control the virtual object to stop moving; in a case that the touch operation is used for controlling the virtual object to squat or go prone, the terminal controls the virtual object to stop a current movement state, and controls the virtual object to squat or go prone in a current location; and in a case that the touch operation is a touch operation on the virtual joystick region, the terminal controls the virtual object to stop a current movement state, and controls the virtual object to move according to a direction and a speed corresponding to the touch operation.

In a possible implementation, in a case that the terminal sets the target function button to an extinguished state, because a default displayed state of the target function button in a case of not controlling the virtual object to automatically move is a hidden state, in a case that a touch operation used for changing a movement state of the virtual object is detected, the terminal may further set the displayed state of the target function button to the hidden state.

Figure 10:
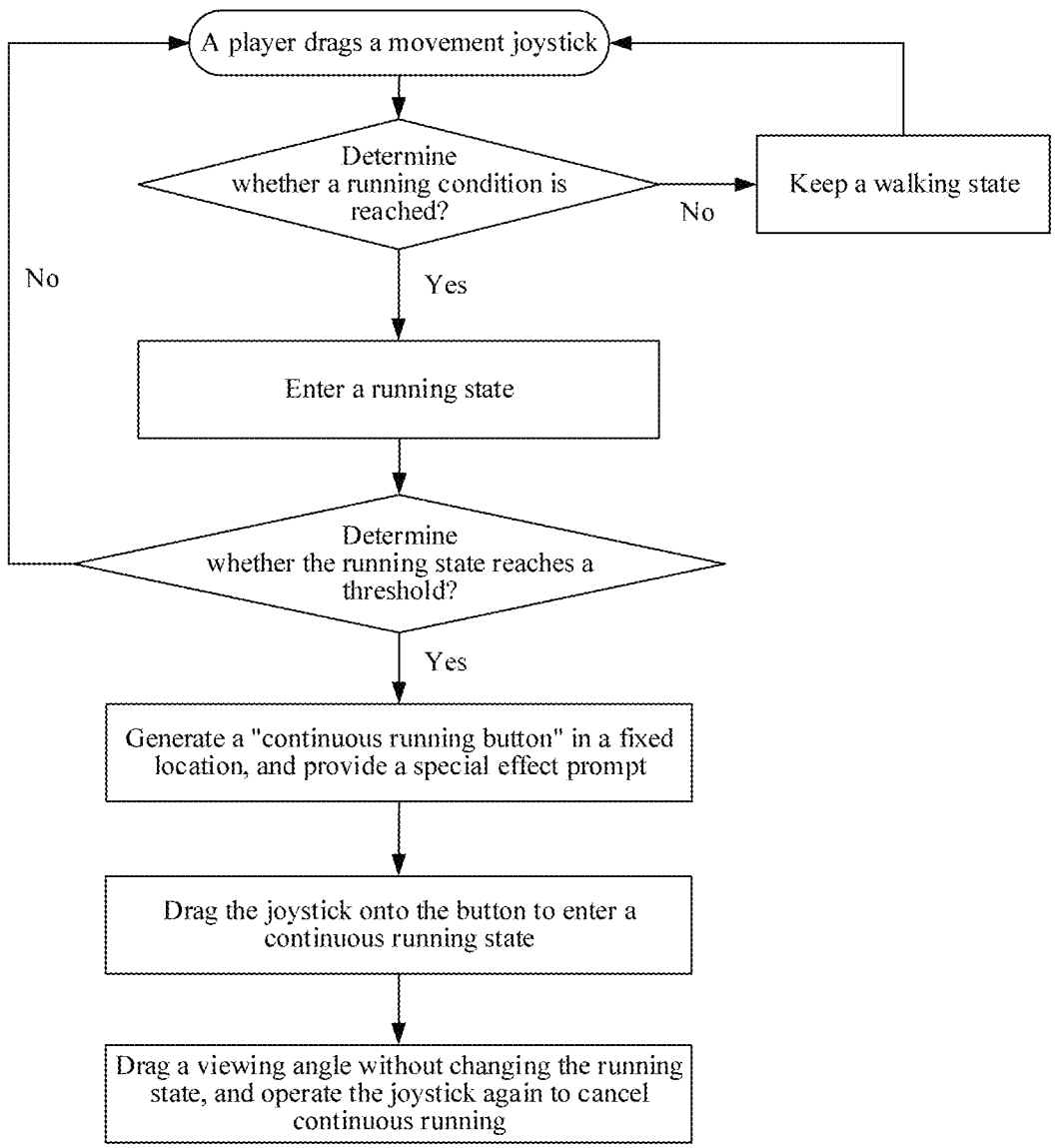
FIG. 10 is a flowchart of a virtual object movement control method according to an embodiment of the present disclosure.

A process of the foregoing virtual object movement control method is described below by using an example provided in an embodiment shown in FIG. 10. FIG. 10 is a flowchart of a virtual object movement control method according to an embodiment of the present disclosure. Referring to FIG. 10, using an example in which the controlled virtual object is located on a land of a virtual scene, and the target function button is named "continuous running button", the terminal detects a drag operation of a player on a movement joystick, and controls the virtual object to perform a corresponding movement according to the drag operation of the player. The player refers to a user of the terminal, and the movement joystick refers to the virtual joystick in the foregoing virtual joystick region.

The terminal may determine whether the drag operation of the player reaches a running condition, and control the virtual object to enter a running state in a case that the drag operation satisfies the condition; or control the virtual object to keep a walking state in a case that the drag operation does not satisfy the condition. Specifically, the running condition means that the player drags the movement joystick to a current location, and a distance between the current location and an initial location of the movement joystick is greater than a threshold. That is, a displacement of the touch operation in this step on the virtual joystick region is greater than a displacement threshold.

In a case that the virtual object is controlled to keep a walking state, the terminal continues to detect the drag operations of the user on the movement joystick. In a case that the virtual object is controlled to enter the running state, the terminal may further determine whether a time of the running state reaches a threshold, and generate a continuous running button if yes; or return to the step of detecting the drag operations of the user on the movement joystick if no. The continuous running button may be located above the initial location of the movement joystick, to help the player continue to push the movement joystick upward to enter a touch range of the button. Certainly, the location of the button may alternatively be set in another place. In this case, the terminal may further provide a special effect prompt, to prompt the player that the virtual object may be controlled to enter a continuous running state by touching the button. The special effect prompt is the foregoing prompt information, and may be specifically in a form of a target arrow.

In a case that the player drags the movement joystick to the continuous running button, the terminal may control the virtual object to enter a continuous running state. That is, in a case that a touch operation on the target function button is detected, the terminal may control the virtual object to automatically move according to a target speed. In addition, after the virtual object enters a continuous running state, the player may further adjust a viewing angle, and the continuous running state of the virtual object may be kept unchanged. In duration of the continuous running state, the continuous running button may be highlighted, for example, an edge of the button is highlighted. That is, the target function button may be set to be highlighted. In a case that the player touches the continuous running button again, the player controls the virtual object to stop the continuous running state.

In the embodiments of the present disclosure, in a case of detecting that a touch operation on a virtual joystick region meets a specific trigger condition, a target function button is displayed, and in a case that a touch operation on the target function button is detected, the virtual object may be controlled to move automatically. In this way, coherent operations may be performed on the same region in the same operating manner, to enable the virtual object to move automatically with no need for a user to switch operations between different buttons, thereby reducing complexity of user operations, and improving convenience and flexibility of the user operations.

Figure 11:
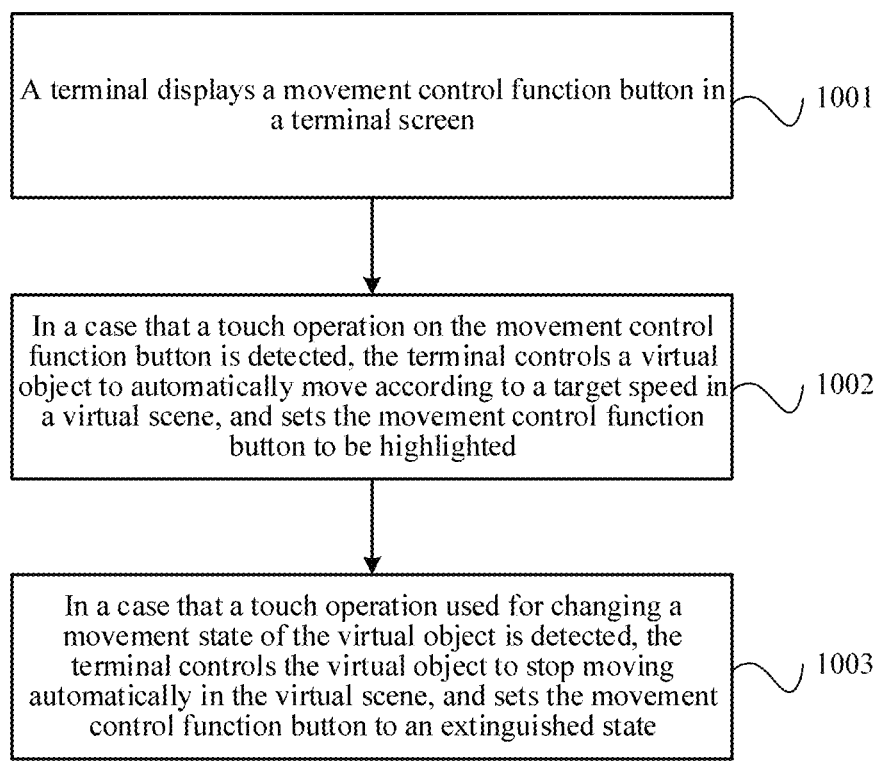
FIG. 11 is a flowchart of a virtual object movement control method according to an embodiment of the present disclosure.

The foregoing embodiment shown in FIG. 2 is a process in which the user performs a touch operation on the target function button to control the virtual object to automatically move. In a possible implementation, because functions of the target function button and the movement control function button are the same, and the movement control function button is in a displayed state all the time, the user may alternatively directly perform a touch operation on the movement control function button, to trigger the foregoing automatic movement function. As shown in FIG. 11, in a case that this operating manner is adopted, the foregoing virtual object movement control method includes the following steps:

Step 1001: A terminal displays a movement control function button in a terminal screen.

Step 1002: In a case that a touch operation on the movement control function button is detected, the terminal controls the virtual object to automatically move according to a target speed in a virtual scene, and sets the movement control function button to be highlighted.

The touch operation on the movement control function button may be a tap operation, or may another touch operation such as a press operation. An operating manner of the touch operation on the movement control function button is not specifically limited in the embodiments of the present disclosure. Step 1002 may be performed in a case that the terminal has not detected a touch operation on the virtual joystick region, or may be performed in a case that the terminal detects a touch operation on the virtual joystick region.

In a case that the terminal performs step 1002, the virtual object may be in a stationary state, or may be in a movement state. In a case that the virtual object is in a stationary state or a moving backward state, the terminal may control the virtual object to automatically move toward the front of the virtual object according to a target speed in the virtual scene; and in a case that the virtual object is in a moving forward state, the terminal may control the virtual object to automatically move toward an original moving direction according to a target speed in the virtual scene. The highlighted may mean that the entire button is lighted, an edge of the button is lighted, or the button flickers according to a specific frequency.

In a case that the movement control function button is in a displayed state all the time, the user directly performs a touch operation on the movement control function button, and the terminal may perform step 1002 in a case that the touch operation is detected. Compared with an operating manner in which a touch operation of a target time is performed on the virtual joystick region to make the terminal display the target function button, this operation is simpler and more convenient, and the movement control function button and the target function button are respectively located in different regions of the screen, so that the user may autonomously choose to perform a touch operation on any button according to a using habit of the user. In a case that the two buttons are respectively located on two sides of the screen, the user may respectively use the left hand and the right hand in a case of performing touch operations on the movement control function button and the target function button. In this way, in a case that the user performs another touch operation while controlling the virtual object to automatically move, the left hand and the right hand may perform different operations, to make the operations convenient and flexible, and it is flexible and convenient for the left hand and the right hand to switch operations.

Figure 12:
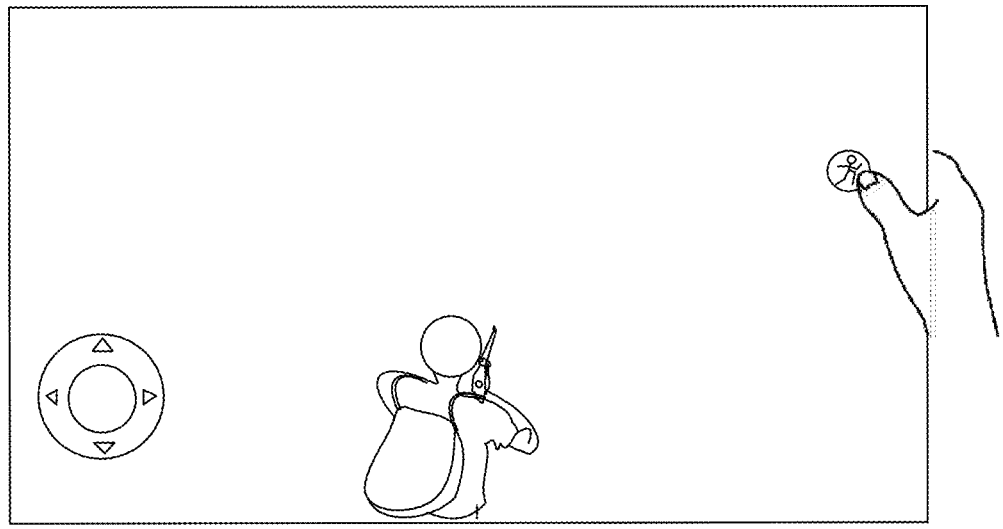
FIG. 12 is a schematic diagram of a virtual object movement control method according to an embodiment of the present disclosure.
Figure 12:
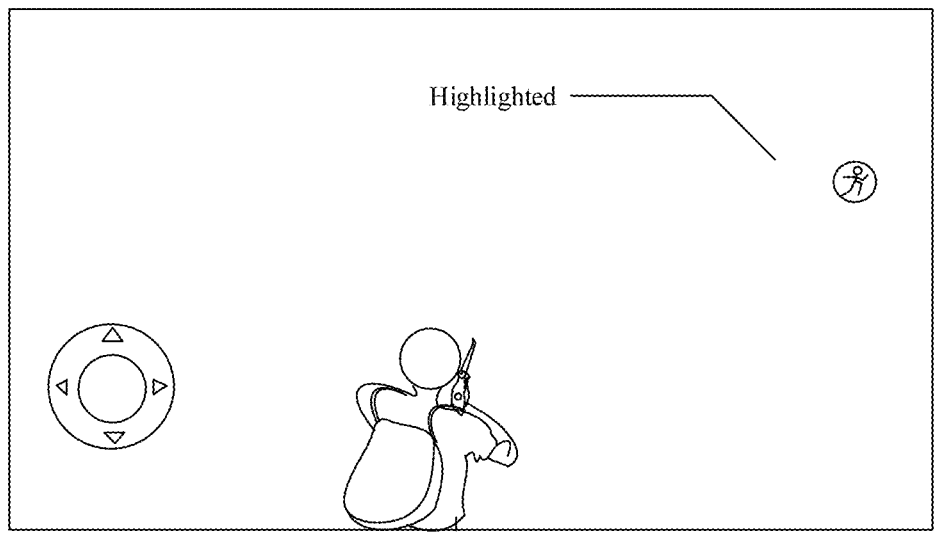

For example, as shown in figure (a) in FIG. 12, the user performs a touch operation on the movement control function button in the terminal interface, and the terminal detects the touch operation, and sets, as shown in figure (b) in FIG. 12, the movement control function button to be highlighted.

Step 1003: In a case that a touch operation used for changing a movement state of the virtual object is detected, the terminal controls the virtual object to stop moving automatically in the virtual scene, and sets the movement control function button to an extinguished state.

Step 1003 is similar to step 208, and details are not described herein again.

In the embodiments of the present disclosure, the function of controlling the virtual object to automatically move is triggered by performing a touch operation on the movement control function button, and a flexible and convenient operating manner is provided, so that in a case that the user performs another touch operation while controlling the virtual object to automatically move, the left hand and the right hand may perform different operations, to make the operations convenient and flexible, and it is flexible and convenient for the left hand and the right hand to switch operations.

All the foregoing optional technical solutions can be randomly combined to form optional embodiments of the present disclosure, which are not described in detail one by one herein.

Figure 13:
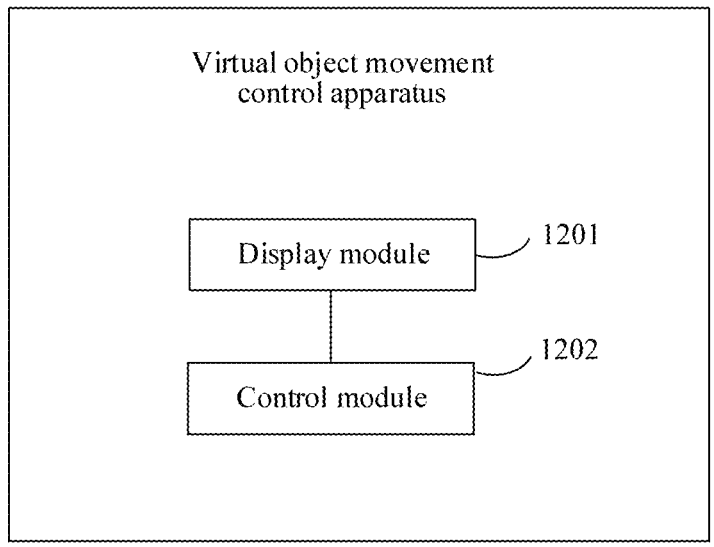
FIG. 13 is a schematic structural diagram of an apparatus for controlling a virtual object to move according to an embodiment of the present disclosure.

FIG. 13 is a schematic structural diagram of an apparatus for controlling a virtual object to move according to an embodiment of the present disclosure. Referring to FIG. 13, the apparatus includes:

a display module 1201, configured to display a virtual joystick region in a terminal screen;

the display module 1201 being further configured to display a target function button in the terminal screen in a case that a touch operation on the virtual joystick region is detected, a displacement of the touch operation is greater than a displacement threshold, and duration of the touch operation is greater than a target time, the target function button being used for controlling a virtual object to automatically move according to a target speed; and a control module 1202, configured to control the virtual object to automatically move according to the target speed in a virtual scene in a case that a touch operation on the target function button is detected.

In a possible implementation, the display module 1201 is configured to determine a first display location directly above the virtual joystick region in the terminal screen, and display the target function button on the first display location.

In a possible implementation, the display module 1201 is configured to determine a second display location directly above a touch point location of the touch operation on the virtual joystick region, and display the target function button on the second display location.

In a possible implementation, the display module 1201 is configured to obtain, according to a direction of a connecting line between a touch point location of the touch operation on the virtual joystick region and the virtual joystick region, a third display location of the target function button in the direction of the connecting line, and display the target function button on the third display location.

In a possible implementation, the display module 1201 is configured to determine, in a case of detecting that the touch operation on the virtual joystick region is in a continuous state, and a touch point of the touch operation moves to a location in which the target function button is located, that a touch operation on the target function button is detected.

In a possible implementation, the display module 1201 is further configured to set the target function button to be highlighted in a case that a touch operation on the target function button is detected.

In a possible implementation, the display module 1201 is further configured to set a displayed state of the target function button to a hidden state in a case of detecting that the touch operation on the virtual joystick region is ended.

In a possible implementation, the display module 1201 is further configured to display prompt information in a case that a touch operation on the virtual joystick region is detected, a displacement of the touch operation is greater than a displacement threshold, and duration of the touch operation is greater than a target time, the prompt information being used for prompting to continuously perform the touch operation, and move the touch point of the touch operation to the location in which the target function button is located, to perform a touch operation on the target function button.

In a possible implementation, the display module 1201 is further configured to display a target arrow between the virtual joystick region and the target function button, a direction of the target arrow being pointing to the target function button from the virtual joystick region.

In a possible implementation, the control module 1202 is further configured to control the virtual object to stop moving automatically in the virtual scene in a case that a touch operation used for changing a movement state of the virtual object is detected, and set the target function button to an extinguished state.

In a possible implementation, the control module 1202 is further configured to control, in a case of detecting a viewing angle adjusting operation, the virtual object to automatically move according to the target speed toward a direction of an adjusted viewing angle in the virtual scene.

In a possible implementation, the control module 1202 is further configured to control the virtual object to automatically move according to the target speed in the virtual scene in a case that a touch operation on the movement control function button is detected, and set the movement control function button to be highlighted, the movement control function button and the target function button having the same function and being respectively displayed in different regions of the screen.

According to the apparatus provided in the embodiments of the present disclosure, in a case of detecting that a touch operation on a virtual joystick region meets a specific trigger condition, a target function button is displayed, and in a case that a touch operation on the target function button is detected, the virtual object may be controlled to move automatically. In this way, coherent operations may be performed on the same region in the same operating manner, to enable the virtual object to move automatically with no need for a user to switch operations between different buttons, thereby reducing complexity of user operations, and improving convenience and flexibility of the user operations.

In a case that the virtual object movement control apparatus provided in the foregoing embodiment controls the virtual object to move, only division of the foregoing function modules is used as an example for description. In the practical application, the functions may be allocated to and completed by different function modules according to requirements. That is, an internal structure of the apparatus is divided into different function modules, to complete all or some of the functions described above. In addition, the virtual object movement control apparatus provided in the foregoing embodiment belongs to the same concept as the virtual object movement control method embodiment. For a specific implementation process of the apparatus, refer to the method embodiment. Details are not described herein again.

Figure 14:
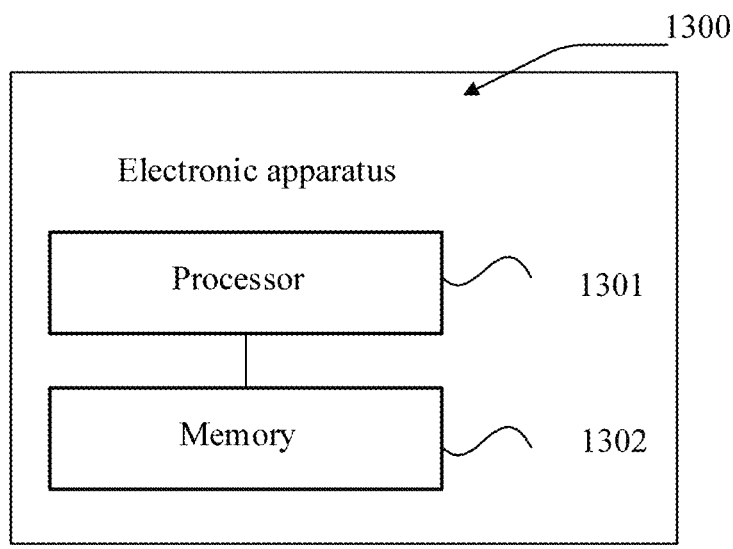
FIG. 14 is a schematic structural diagram of an electronic apparatus according to an embodiment of the present disclosure.

FIG. 14 is a schematic structural diagram of an electronic apparatus according to an embodiment of the present disclosure. The electronic apparatus 1300 may vary greatly due to different configurations or performance, and may include one or more central processing units (CPU) 1301 and one or more memories 1302, where the memory 1302 stores at least one instruction, and the at least one instruction is loaded and executed by the processor 1301 to implement the following method steps:

displaying a virtual joystick region in a terminal screen;

displaying a target function button in the terminal screen in a case that a touch operation on the virtual joystick region is detected, a displacement of the touch operation is greater than a displacement threshold, and duration of the touch operation is greater than a target time, the target function button being used for controlling a virtual object to automatically move according to a target speed; and controlling the virtual object to automatically move according to the target speed in a virtual scene in a case that a touch operation on the target function button is detected.

In a possible implementation, the processor 1301 is configured to determine a first display location directly above the virtual joystick region in the terminal screen, and display the target function button on the first display location.

In a possible implementation, the processor 1301 is configured to determine a second display location directly above a touch point location of the touch operation on the virtual joystick region, and display the target function button on the second display location.

In a possible implementation, the processor 1301 is configured to obtain, according to a direction of a connecting line between a touch point location of the touch operation on the virtual joystick region and the virtual joystick region, a third display location of the target function button in the direction of the connecting line, and display the target function button on the third display location.

In a possible implementation, the processor 1301 is configured to determine, in a case of detecting that the touch operation on the virtual joystick region is in a continuous state, and a touch point of the touch operation moves to a location in which the target function button is located, that a touch operation on the target function button is detected.

In a possible implementation, the processor 1301 is further configured to set the target function button to be highlighted in a case that a touch operation on the target function button is detected.

In a possible implementation, the processor 1301 is further configured to set a displayed state of the target function button to a hidden state in a case of detecting that the touch operation on the virtual joystick region is ended.

In a possible implementation, the processor 1301 is further configured to display prompt information in a case that a touch operation on the virtual joystick region is detected, a displacement of the touch operation is greater than a displacement threshold, and duration of the touch operation is greater than a target time, the prompt information being used for prompting to continuously perform the touch operation, and move the touch point of the touch operation to the location in which the target function button is located, to perform a touch operation on the target function button.

In a possible implementation, the processor 1301 is configured to display a target arrow between the virtual joystick region and the target function button, a direction of the target arrow being pointing to the target function button from the virtual joystick region.

In a possible implementation, the processor 1301 is further configured to control the virtual object to stop moving automatically in the virtual scene in a case that a touch operation used for changing a movement state of the virtual object is detected, and set the target function button to an extinguished state.

In a possible implementation, the processor 1301 is further configured to control, in a case of detecting a viewing angle adjusting operation, the virtual object to automatically move according to the target speed toward a direction of an adjusted viewing angle in the virtual scene.

In a possible implementation, the processor 1301 is further configured to control the virtual object to automatically move according to the target speed in the virtual scene in a case that a touch operation on the movement control function button is detected, and set the movement control function button to be highlighted, the movement control function button and the target function button having the same function and being respectively displayed in different regions of the screen.

Certainly, the electronic apparatus 1300 may further include components such as a wired or wireless network interface, a keyboard, and an input/output interface, to facilitate input/output. The electronic apparatus 1300 may further include another component configured to implement functions of a device, and details are not described herein again. In an exemplary embodiment, a computer-readable storage medium is further provided, such as a memory including instructions, where the foregoing instructions may be executed by a processor in a terminal to complete the virtual object movement control method in the foregoing embodiments. For example, the computer-readable storage medium may be read-only memory (ROM), a random access memory (RAM), a compact disc ROM (CD-ROM), a magnetic tape, a floppy disk, an optical data storage device, or the like.

A person of ordinary skill in the art may understand that all or some of the steps of the embodiments may be implemented by using hardware or a program instructing related hardware. The program may be stored in a computer-readable storage medium. The storage medium may include: a read-only memory, a magnetic disk, an optical disc, or the like.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for controlling a virtual object movement performed by an electronic apparatus, the method comprising:
displaying a virtual joystick region in a terminal screen of the electronic apparatus;
in accordance with a determination that (i) a touch operation on the virtual joystick region is detected, (ii) a displacement of the touch operation is greater than a displacement threshold, and (iii) a duration of the touch operation is greater than a target time:
rendering a target function button in the terminal screen, the target function button being used for controlling a virtual object to automatically move according to a target speed; and
causing the virtual object to start moving automatically according to the target speed after a first touch operation on the target function button is detected; and
controlling the virtual object to continuously move in a virtual scene automatically without further touch operations until a second touch operation on the target function button is detected.

2. The method according to claim 1, wherein the displaying a target function button in the terminal screen comprises:
determining a first display location directly above the virtual joystick region in the terminal screen, and displaying the target function button on the first display location.

3. The method according to claim 1, wherein the displaying a target function button in the terminal screen comprises:
determining a second display location directly above a touch point location of the touch operation on the virtual joystick region, and displaying the target function button on the second display location.

4. The method according to claim 1, wherein the displaying a target function button in the terminal screen comprises:
obtaining, according to a direction of a connecting line between a touch point location of the touch operation on the virtual joystick region and the virtual joystick region, a third display location of the target function button in the direction of the connecting line, and displaying the target function button on the third display location.

5. The method according to claim 1, wherein that a touch operation on the target function button is detected comprises:
determining, in a case of detecting that the touch operation on the virtual joystick region is in a continuous state, and a touch point of the touch operation moves to a location in which the target function button is located, that a touch operation on the target function button is detected.

6. The method according to claim 1, further comprising:
setting the target function button to be highlighted in a case that a touch operation on the target function button is detected.

7. The method according to claim 1, further comprising:
after displaying a target function button in the terminal screen, setting a displayed state of the target function button to a hidden state in a case of detecting that the touch operation on the virtual joystick region is ended.

8. The method according to claim 1, further comprising:
displaying prompt information in a case that the touch operation on the virtual joystick region is detected, the displacement of the touch operation is greater than the displacement threshold, and the duration of the touch operation is greater than the target time, the prompt information being used for prompting to continuously perform the touch operation, and move the touch point of the touch operation to the location in which the target function button is located, to perform a touch operation on the target function button.

9. The method according to claim 8, wherein the displaying prompt information comprises:
displaying a target arrow between the virtual joystick region and the target function button, a direction of the target arrow being pointing to the target function button from the virtual joystick region.

10. The method according to claim 1, further comprising:
after controlling the virtual object to automatically move according to the target speed in a virtual scene, controlling the virtual object to stop moving automatically in the virtual scene in a case that a touch operation used for changing a movement state of the virtual object is detected, and setting the target function button to an extinguished state.

11. The method according to claim 1, further comprising:
after controlling the virtual object to automatically move according to the target speed in a virtual scene, controlling, in a case of detecting a viewing angle adjusting operation, the virtual object to automatically move according to the target speed toward a direction of an adjusted viewing angle in the virtual scene.

12. The method according to claim 1, further comprising:
controlling the virtual object to automatically move according to the target speed in the virtual scene in a case that a touch operation on a movement control function button is detected, and setting the movement control function button to be highlighted, the movement control function button and the target function button having the same function and being respectively displayed in different regions of the screen.

13. An electronic apparatus, comprising:
a processor; and
a memory configured to store a computer program;
the processor being configured to execute the computer program stored in the memory to implement a plurality of operations including:
displaying a virtual joystick region in a terminal screen of the electronic apparatus;
in accordance with a determination that (i) a touch operation on the virtual joystick region is detected, (ii) a displacement of the touch operation is greater than a displacement threshold, and (iii) a duration of the touch operation is greater than a target time:
rendering a target function button in the terminal screen, the target function button being used for controlling a virtual object to automatically move according to a target speed; and causing the virtual object to start moving automatically according to the target speed after a first touch operation on the target function button is detected; and controlling the virtual object to continuously move in a virtual scene automatically without further touch operations until a second touch operation on the target function button is detected.

14. The electronic apparatus according to claim 13, wherein the processor is configured to determine a first display location directly above the virtual joystick region in the terminal screen, and display the target function button on the first display location.

15. The electronic apparatus according to claim 13, wherein the processor is configured to determine a second display location directly above a touch point location of the touch operation on the virtual joystick region, and display the target function button on the second display location.

16. The electronic apparatus according to claim 13, wherein the processor is configured to obtain, according to a direction of a connecting line between a touch point location of the touch operation on the virtual joystick region and the virtual joystick region, a third display location of the target function button in the direction of the connecting line, and display the target function button on the third display location.

17. The electronic apparatus according to claim 13, wherein the processor is configured to determine, in a case of detecting that the touch operation on the virtual joystick region is in a continuous state, and a touch point of the touch operation moves to a location in which the target function button is located, that a touch operation on the target function button is detected.

18. The electronic apparatus according to claim 13, wherein the processor is further configured to set the target function button to be highlighted in a case that a touch operation on the target function button is detected.

19. The electronic apparatus according to claim 13, wherein the processor is further configured to set a displayed state of the target function button to a hidden state in a case of detecting that the touch operation on the virtual joystick region is ended.

20. A non-transitory computer-readable storage medium, storing at least one instruction, at least one program, and a code set or an instruction set, the instruction, the program, and the code set or the instruction set being loaded and executed by a processor of an electronic apparatus to implement operations including:

displaying a virtual joystick region in a terminal screen of the electronic apparatus;

in accordance with a determination that (i) a touch operation on the virtual joystick region is detected, (ii) a displacement of the touch operation is greater than a displacement threshold, and (iii) a duration of the touch operation is greater than a target time:
rendering a target function button in the terminal screen, the target function button being used for controlling a virtual object to automatically move according to a target speed; and causing the virtual object to start moving automatically according to the target speed after a first touch operation on the target function button is detected; and controlling the virtual object to continuously move in a virtual scene automatically without further touch operations until a second touch operation on the target function button is detected.

* * * * *